(12) United States Patent
Hou

(10) Patent No.: US 12,252,136 B2
(45) Date of Patent: Mar. 18, 2025

(54) WARNING METHOD AND APPARATUS FOR DRIVING RISK, COMPUTING DEVICE AND STORAGE MEDIUM

(71) Applicant: TENCENT TECHNOLOGY (SHENZHEN) COMPANY LIMITED, Guangdong (CN)

(72) Inventor: Chen Hou, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 113 days.

(21) Appl. No.: 17/968,341

(22) Filed: Oct. 18, 2022

(65) Prior Publication Data

US 2023/0048112 A1 Feb. 16, 2023

Related U.S. Application Data

(63) Continuation-in-part of application No. PCT/CN2021/114418, filed on Aug. 25, 2021.

(30) Foreign Application Priority Data

Oct. 15, 2020 (CN) .......................... 202011105843.X

(51) Int. Cl.
*B60W 40/09* (2012.01)
*B60W 50/14* (2020.01)
*G06V 20/59* (2022.01)

(52) U.S. Cl.
CPC ............ *B60W 40/09* (2013.01); *B60W 50/14* (2013.01); *G06V 20/597* (2022.01);
(Continued)

(58) Field of Classification Search
CPC ............. B60W 40/08; B60W 40/0818; B60W 40/0827; B60W 40/0836; B60W 40/0845;
(Continued)

(56) References Cited

U.S. PATENT DOCUMENTS

2018/0170375 A1 6/2018 Jang et al.
2021/0284197 A1* 9/2021 Mori ...................... G06N 5/022
(Continued)

FOREIGN PATENT DOCUMENTS

CN 107945311 A 4/2018
CN 110555366 A 12/2019
(Continued)

OTHER PUBLICATIONS

Written Opinion for PCT/CN2021/114418 dated Oct. 14, 2021.
International Search Report for PCT/CN2021/114418 dated Oct. 14, 2021.

*Primary Examiner* — Aaron L Troost
(74) *Attorney, Agent, or Firm* — Sughrue Mion, PLLC

(57) ABSTRACT

Embodiments of the disclosure provide a warning method and an apparatus for a driving risk, a computing device and a storage medium. In an embodiment, driving behavior data of a driver in a first time period is obtained, and a correspondence between a quantity of occurrences of preset driving behaviors of one or more drivers and a quantity of an actual occurrence of preset scenarios to the one or more drivers while driving is obtained. Based on a quantity of actual occurrences of the preset driving behaviors of the driver, indicated in the driving behavior data of the driver, and the correspondence, it is predicted a target quantity of times the driver is predicted to encounter one or more preset scenarios in the first time period, and warning information is generated based on the target quantity of times.

16 Claims, 7 Drawing Sheets

(52) U.S. Cl.
CPC . *B60W 2050/146* (2013.01); *B60W 2420/403* (2013.01); *B60W 2556/10* (2020.02)

(58) Field of Classification Search
CPC ......... B60W 40/0854; B60W 40/0863; B60W 40/09
See application file for complete search history.

(56) References Cited

U.S. PATENT DOCUMENTS

2022/0101443 A1\* 3/2022 Yoshiki .............. G01C 21/3697
2022/0135052 A1\* 5/2022 Patel ................... G06V 20/588
340/439

FOREIGN PATENT DOCUMENTS

| | | | |
|---|---|---|---|
| CN | 111274881 | A | 6/2020 |
| CN | 111310562 | A | 6/2020 |
| CN | 111489588 | A | 8/2020 |
| CN | 112193252 | A | 1/2021 |
| DE | 10 2015 004 748 | A1 | 10/2016 |
| JP | 2016042298 | A \* | 3/2016 |

\* cited by examiner

WARNING METHOD AND APPARATUS FOR DRIVING RISK, COMPUTING DEVICE AND STORAGE MEDIUM

CROSS-REFERENCE TO RELATED APPLICATION(S)

This application is a continuation application of International Application No. PCT/CN2021/114418, filed Aug. 25, 2021, which claims priority to Chinese Patent Application No. 202011105843.X, filed with the National Intellectual Property Administration, PRC on Oct. 15, 2020, the disclosures of which are incorporated herein by reference in their entireties.

FIELD

Embodiments of the disclosure relate to the field of intelligent driving technologies, and in particular, to a driving risk warning.

BACKGROUND

In a driving process of a vehicle, how to achieve a safe driving is the most important issue for drivers.

With the development of computer vision technologies, the computer vision technologies have been widely used in the field of safe driving. For example, in the related art, a camera is installed on the vehicle, and the camera is configured to collect driving behavior of a driver in real time, and providing a warning about a risk while driving based on the driving behavior of the driver.

However, the risk warning based on driving behavior in the related art may not obtain attention of the driver, and it is difficult to achieve an effective human-computer interaction.

SUMMARY

Embodiments of the disclosure provide a warning method and apparatus for a driving risk, a computing device and a storage medium, to improve a warning accuracy of vehicle driving risks, and realize an accurate warning of various dangerous scenarios that may be caused by a current dangerous driving behavior of a driver.

According to one aspect, an embodiment of the disclosure provides a warning method for a driving risk, performed by a computing device, and the method includes:
  obtaining dangerous driving behavior data of a driver in a first time period, and obtaining a correspondence between a quantity of occurrences of dangerous driving behaviors of one or more drivers and a quantity of an actual occurrence of dangerous scenarios to the one or more drivers while driving;
  predicting, based on a quantity of actual occurrences of the dangerous driving behaviors of the driver, indicated in the dangerous driving behavior data of the driver, and the correspondence, a target quantity of times the driver is predicted to encounter one or more dangerous scenarios in the first time period; and
  generating warning information based on the target quantity of times.

According to another aspect, an embodiment of the disclosure provides a warning apparatus for a driving risk, including at least one memory configured to store program code; and at least one processor configured to read the program code and operate as instructed by the program code, the program code including:
  first obtaining code configured to cause the at least one processor to obtain dangerous driving behavior data of a driver in a first time period, and obtain a correspondence between a quantity of occurrences of dangerous driving behaviors of one or more drivers and a quantity of an actual occurrence of dangerous scenarios to the one or more drivers while driving;
  first prediction code configured to cause the at least one processor to predict, based on a quantity of actual occurrences of the dangerous driving behaviors of the driver, indicated in the dangerous driving behavior data of the driver, and the correspondence, a target quantity of times the driver is predicted to encounter one or more dangerous scenarios in the first time period; and
  generating code configured to cause the at least one processor to generate warning information based on the target quantity of times.

According to another aspect, an embodiment of the disclosure provides a computing device, including a processor and a memory;
  the memory being configured to store a computer program; and
  the processor being configured to execute the computer program to implement the warning method for a driving risk according to the foregoing aspect.

According to another aspect, an embodiment of the disclosure provides a computer-readable storage medium, storing a computer program, the computer program being configured to perform the warning method for a driving risk according to the foregoing aspect.

According to another aspect, an embodiment of the disclosure provides a computer program product, including a computer program, the computer instructions being stored in a readable storage medium. At least one processor of the computer may read the computer program from the readable storage medium, and the at least one processor executes the computer program to cause the computer to implement the warning method for a driving risk according to the foregoing aspect.

DETAILED DESCRIPTION

Figure 1:
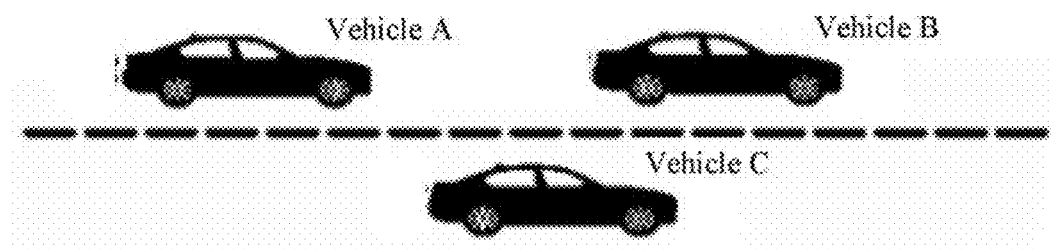
FIG. 1 is a schematic diagram of an application scenario according to an embodiment of the disclosure.

Technical solutions in the embodiments of the disclosure are described below with reference to the accompanying drawings in the embodiments of the disclosure.

For ease of understanding the embodiments of the disclosure, related concepts involved in the embodiments of the disclosure are first briefly introduced below.

Vehicle to everything (V2X) provides vehicle information through sensors and in-vehicle terminals installed on vehicles, and realizes mutual communications among vehicle to vehicle (V2V), vehicle to infrastructure (V2I), vehicle to pedestrian (V2P) and vehicle to network (V2N) through various communication technologies.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that may react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

The CV is a science that studies how to use a machine to "see", and furthermore, is machine vision that a camera and a computer are configured to replace human eyes to perform recognition, tracking, measurement, and the like on a target, and further perform graphic processing, so that the computer processes the target into an image more suitable for human eyes to observe, or an image transmitted to an instrument for detection. As a scientific discipline, computer vision deals with related theories and technologies in an attempt to create an artificial intelligence system capable of obtaining information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

Intelligent driving technologies include high-precision maps, environment perception, behavior decision-making, path planning, motion control, and other technologies. Intelligent driving technologies have a wide range of application prospects. The embodiments of the disclosure are applied to the field of intelligent driving technologies, and used for warning a driver of a driving risk, to assist the driver to drive safely.

In the embodiments of the disclosure, a mutual communication between the vehicle driven by the driver and the network may be realized through the V2X technologies. In some implementations, a correspondence, a predicted quantity of times for which the driver encounters dangerous scenarios, and the like, may be obtained through the network. Further, collected images (such as a driver image or a driving road condition image) may be analyzed through computer vision technologies to obtain dangerous driving behavior data or dangerous scenario data.

It is to be understood that in the embodiments of the disclosure, "B corresponding to A" indicates that B is associated with A. In an implementation, B may be determined according to A. However, it is to be further understood that determining B according to A does not mean that determining B only according to A, and B may be determined according to A and/or other information.

In the descriptions of the disclosure, unless otherwise described, "a plurality of" means two or more than two.

In addition, for ease of describing the technical solutions in the embodiments of the disclosure clearly, in the embodiments of the disclosure, terms such as "first" and "second" are used to distinguish same or similar items with a basically same function and purpose. A person skilled in the art would understand that the terms such as "first" and "second" do not define a quantity and an execution sequence, and the terms such as "first" and "second" do not indicate a definite difference.

FIG. 1 is a schematic diagram of an application scenario according to an embodiment of the disclosure. As shown in FIG. 1, vehicle A, vehicle B and vehicle C are all moving vehicles. The warning method for a driving risk provided in the embodiments of the disclosure may provide a warning service for a driver of at least one of the vehicles in a driving process.

The warning method for a driving risk provided in the embodiments of the disclosure may be performed by a computing device. The computing device may be a terminal device or a server having a vehicle warning processing capability. The server may be an independent physical server, or may be a server cluster including a plurality of physical servers or a distributed system, or may further be a cloud server providing a cloud computing service. The terminal may be a smartphone, a tablet computer, a notebook computer, a desktop computer, a smart speaker, a smart watch, an in-vehicle terminal, a smart TV and the like, but is not limited thereto. The terminal device and the server may be directly or indirectly connected through wired or wireless communication, which is not limited in the disclosure. When the computing device is a server, the computing device may be connected to the vehicle driven by the driver through the V2X, to obtain dangerous driving behaviors from the vehicle and return warning information to the vehicle.

Figure 2:
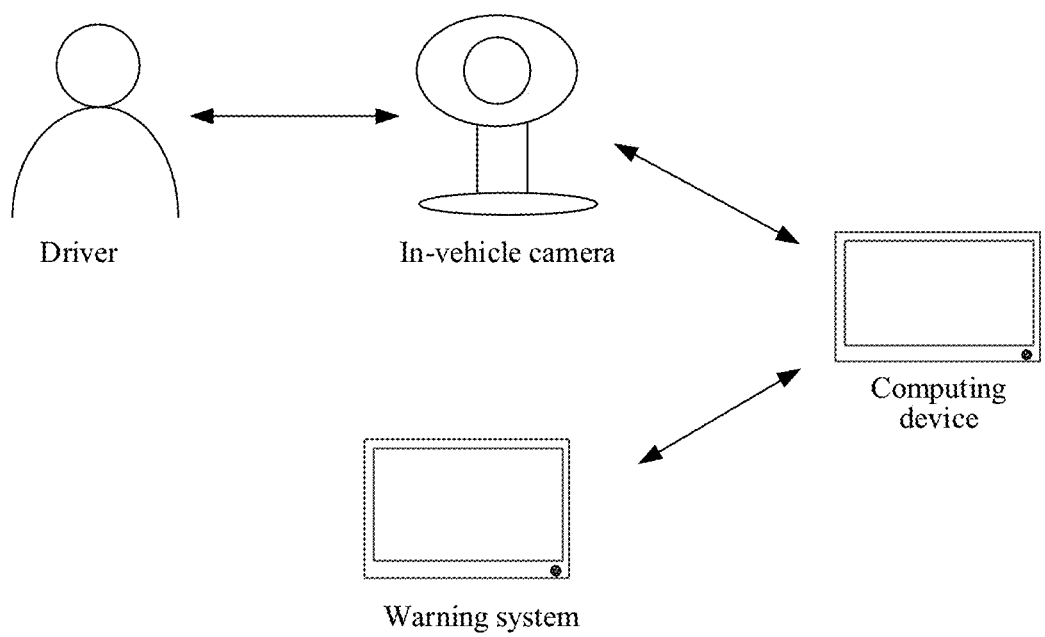
FIG. 2 is a diagram of system architecture involved in an embodiment of the disclosure.

FIG. 2 is a diagram of system architecture involved in an embodiment of the disclosure. As shown in FIG. 2, the system architecture includes: a driver, a computing device, an in-vehicle camera and a warning system.

The in-vehicle camera is installed on a vehicle to collect a driver image. In an embodiment, the in-vehicle camera may be an AI camera. The AI camera may use computer vision technologies to obtain dangerous driving behavior data of the driver.

The computing device is respectively in communication connection with the in-vehicle camera and the warning system. The computing device may obtain data from the in-vehicle camera and the warning system, or may send data to the in-vehicle camera and the warning system. For example, the computing device may obtain data of driving behaviors of the driver from the in-vehicle camera, and may obtain dangerous scenario data of the vehicle from the warning system.

In an embodiment, the foregoing computing device may be configured to perform the technical solutions of the embodiments of the disclosure. For example, the computing device may be configured to obtain the dangerous driving behavior data of the driver in the first time period, and obtain the correspondence between the quantity of occurrences of the dangerous driving behaviors and the actual quantity of occurrences (or a quantity of an actual occurrence) of the dangerous scenarios; and predict the target quantity of times for which the driver encounters different dangerous scenarios in the first time period according to the quantity of occurrences of the dangerous driving behaviors involved in the first dangerous driving behavior data and the correspondence, and finally, generate the warning information according to the target quantity of times.

In some embodiments, if the foregoing computing device does not have a display function, the computing device may send the generated warning information to the warning system, and the warning system displays the warning information.

In some embodiments, if the foregoing computing device has a display function, for example, when the computing device has a display screen, the computing device may directly display the warning information.

The warning system is installed on a vehicle to give a warning of dangerous scenarios and save dangerous scenario data that have actually occurred in the vehicle.

In some embodiments, if the computing device is an in-vehicle device, the foregoing warning system may be installed on the computing device.

The warning method for a driving risk in the related art is to predict a possibility of an occurrence of a dangerous scenario to a driver based on historical driving behavior of the driver, having a low warning accuracy. Therefore, it is impossible to give a warning to various dangerous scenarios that may be caused by the dangerous driving behavior of the driver at the current moment, and it is difficult to have an effective warning effect. To solve the foregoing technical problems, the embodiments of the disclosure provide a prediction method and apparatus for a driving risk to obtain dangerous driving behavior data of a driver in a first time period, and obtain a correspondence between a quantity of occurrences of dangerous driving behaviors and a quantity of an actual occurrence of dangerous scenarios. The correspondence may truly reflect the relationship between the quantity of occurrences of the actual occurrence of the dangerous scenario and the quantity of occurrences of the dangerous driving behaviors made by the driver before the driver encounters the dangerous scenario. Therefore, the target quantity of times for which the driver may encounter different dangerous scenarios in the first time period may be accurately predicted through the correspondence and the quantity of occurrences of the dangerous driving behaviors involved in the dangerous driving behavior data and the risk warning is given to the driver based on the warning information generated by the target quantity of times. Because the warning information is determined according to the dangerous scenarios that may be caused by the dangerous driving behaviors of the driver, the driver may clearly learn what kind of serious consequences his dangerous driving behaviors may cause through the warning. This result-oriented warning method has an intuitive prompt, which may effectively improve the efficiency of human-computer interaction and achieve the purpose of regulating driving behaviors.

Some embodiments are used below to describe in detail the technical solutions of the embodiments of the disclosure. The following embodiments may be mutually combined, and same or similar concepts or processes may not be repeatedly described in some embodiments.

Figure 3:
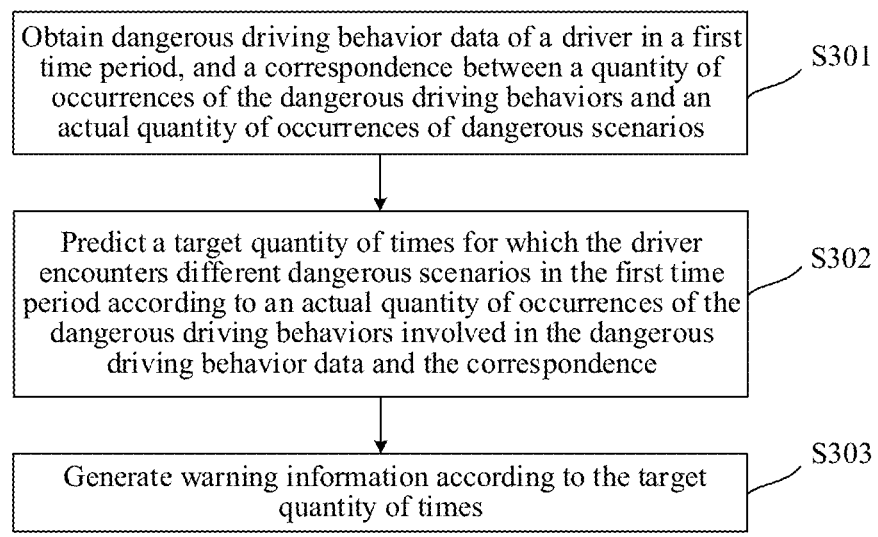
FIG. 3 is a schematic flowchart of a warning method for a driving risk according to an embodiment of the disclosure.

FIG. 3 is a schematic flowchart of a warning method for a driving risk according to an embodiment of the disclosure. As shown in FIG. 3, the method of the embodiment of the disclosure includes S301-S303:

S301: Obtain dangerous driving behavior data of a driver in a first time period, and a correspondence between a quantity of occurrences of the dangerous driving behaviors and a quantity of an actual occurrence of dangerous scenarios.

An execution entity of the embodiment of the disclosure is the foregoing computing device. In some embodiments, the foregoing execution entity is a unit having a data processing function in the computing device, such as a processor in the computing device.

The dangerous driving behaviors involved in the embodiment of the disclosure include preset M different types of dangerous driving behaviors, as shown in Table 1, including fatigue driving, distracted driving, drunk driving, not wearing a seat belt, and the like, where M is an integer greater than or equal to 1. Types of dangerous driving behaviors may be set according to actual needs. This is not limited in the embodiment of the disclosure.

TABLE 1

| Types of the dangerous driving behaviors | Names of the dangerous driving behaviors |
| --- | --- |
| First type of the dangerous driving behaviors | Fatigue driving |
| Second type of the dangerous driving behaviors | Not wearing a seat belt |
| Third type of the dangerous driving behaviors | Drunk driving |
| Fourth type of the dangerous driving behaviors | Distracted driving |
| ... | ... |

If the dangerous driving behaviors include speeding, the computing device may obtain the speed of the vehicle from a driving system of the vehicle to determine whether the vehicle is speeding.

In some embodiments, types of dangerous driving behaviors may be saved in advance in the in-vehicle camera shown in FIG. 2. In an embodiment, the computing device may obtain the types of dangerous driving behaviors from the in-vehicle camera.

In some embodiments, the types of dangerous driving behaviors may be saved in advance in the computing device.

The dangerous scenarios involved in the embodiment of the disclosure include preset N different types of dangerous scenarios, as shown in Table 2, including lane departure, pedestrian collision, front collision, safe vehicle distance, and the like, where N is an integer greater than or equal to 1. Types of dangerous scenarios may be set according to actual needs. This is not limited in the embodiment of the disclosure.

TABLE 2

| Types of the dangerous scenarios | Names of the dangerous scenarios |
| --- | --- |
| First type of the dangerous scenarios | Lane departure |
| Second type of the dangerous scenarios | Pedestrian collision |
| Third type of the dangerous scenarios | Front collision |
| Fourth type of the dangerous scenarios | Safe vehicle distance |
| ... | ... |

In some embodiments, types of dangerous scenarios may be saved in advance in the warning system shown in FIG. 2. In an embodiment, the computing device may obtain the types of dangerous scenarios from the warning system.

In some embodiments, the types of dangerous scenarios may be saved in advance in the computing device.

In the embodiment of the disclosure, manners of obtaining the dangerous driving behavior data of the driver in the first time period in the foregoing S301 include at least the following two manners. When the in-vehicle camera shown in FIG. 2 is a first in-vehicle camera without an image recognition function, the computing device may adopt manner 1 to obtain the dangerous driving behavior data of the driver. When the in-vehicle camera shown in FIG. 2 is a second in-vehicle camera with an image recognition function, the computing device may adopt manner 2 to obtain the dangerous driving behavior data of the driver, specifically being:

Manner 1: The computing device generates dangerous driving behavior data based on a driver image collected by a first in-vehicle camera, and an example process includes the following step C1 to step C3:

Step C1: Obtain a driver image collected by a first in-vehicle camera in a first time period.

The first in-vehicle camera is installed on the vehicle at a position facing the driver and is configured to collect the driver image in real time. In addition, the first in-vehicle camera is in communication connection with the computing device, and may send the driver image collected in the current time period to the computing device.

Step C2: Recognize a quantity of an actual occurrence of the different types of dangerous driving behaviors in the driver image according to types of the dangerous driving behavior.

Specifically, the computing device may obtain the driver image collected by the first in-vehicle camera from the first in-vehicle camera in the first time period; recognize facial features and behavioral features of the driver in the driver image according to types of the preset M dangerous driving behaviors; and determine which types of the dangerous driving behaviors among the M types of the dangerous driving behaviors of the driver in the first time period and the actual quantity of occurrences of the dangerous driving behaviors. For example, the computing device includes a pre-trained image recognition model. The image recognition model may recognize the facial features and the behavioral features of the driver. The computing device inputs the driver image into the image recognition model, and the image recognition model recognizes the facial features and behavioral features of the driver. The facial features include an eye state (such as whether the eyes are open or squinted), a mouth state (such as whether the mouth is open or closed, the size of the opening), a head position, and the like, and the behavioral features include hand movements and upper body movements, and the like. The computing device compares the facial features and behavioral features of the driver recognized by the image recognition model with the facial features and behavioral features corresponding to each of the M types of the dangerous driving behaviors to determine dangerous driving behavior corresponding to the recognized facial features and behavioral features. For example, if it is recognized that the eyes of the driver are squinted and the mouth is open, it may be determined that the driver has a fatigue driving; if a seat belt is not recognized in the driver image, it may be determined that the driver is not wearing the seat belt; and if it is recognized that the hand of the driver is raised and there is a phone in his hand, it may be determined that the driver has a distracted driving or the like. The facial features and the behavioral features of the driver corresponding to the different dangerous driving behaviors may be set according to actual situations.

Step C3: Obtain dangerous driving behavior data according to the actual quantity of occurrences.

If a plurality of driver images are collected in the first time period, the foregoing recognition method is used for each driver image to recognize the dangerous driving behavior of the driver in each driver image. According to the dangerous driving behavior of the driver in each driver image, the actual quantity of occurrences of each dangerous driving behavior in the plurality of driver images is counted. For example, if fatigued driving is recognized in 10 driver images in 1000 driver images, it may be determined that the driver has 10 fatigue driving in the current time period. Each recognized dangerous driving behavior and the quantity of occurrences of each dangerous driving behavior are taken as first dangerous driving behavior data. That is to say, the first dangerous driving behavior data includes the recognized each dangerous driving behavior of the driver in the current time period and the quantity of occurrences of each dangerous driving behavior. For the dangerous driving behavior of not wearing a seat belt, if the seat belt is not recognized in the consecutively collected driver images, it is determined that the actual quantity of occurrences of the driver not wearing the seat belt is 1, rather than a plurality of times.

Manner 2: The computing device obtains dangerous driving behavior data of a driver from a second in-vehicle camera in a first time period.

Figure 4:
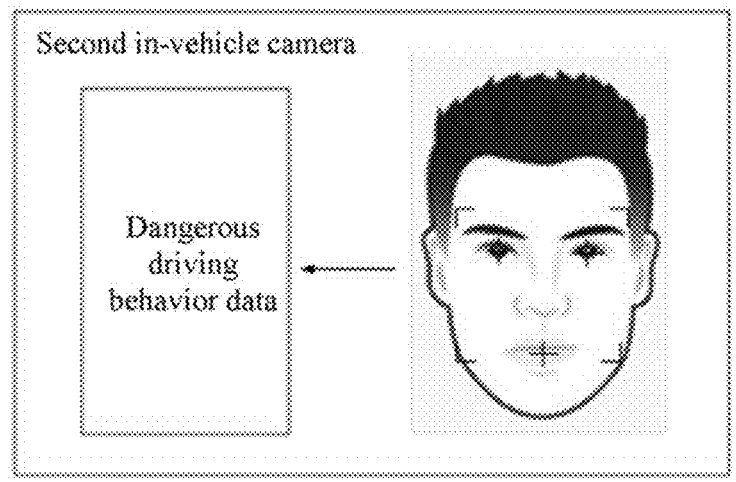
FIG. 4 is a schematic diagram of an image processing involved in an embodiment of the disclosure.

In this manner, the in-vehicle camera shown in FIG. 2 is a second in-vehicle camera, and the second in-vehicle camera is a camera with an image recognition function, such as an AI camera. The second in-vehicle camera may include a camera module and a processor. The camera module is configured to collect a driver image in real time, and sending the collected driver image to the processor. As shown in FIG. 4, the processor sequentially processes the collected driver image based on the computer vision technologies to obtain dangerous driving behavior data shown on the left. Specifically, the processor performs image recognition processing on the driver image according to the preset M types of the dangerous driving behaviors, and obtains the dangerous driving behaviors of the driver in the first time period. For example, the processor recognizes the facial features and behavioral features of the driver in the driver image. If it is recognized that the eyes of the driver are closed and the mouth is open, it may be determined that the driver has a fatigue driving, and if a seat belt is not recognized in the driver image, it may be determined that the driver is not wearing the seat belt. In this way, the processor generates the dangerous driving behavior data according to the recognized dangerous driving behavior of the driver. In this manner, the method for the processor to recognize the dangerous driving behaviors of the driver in the driver image is basically the same as the method for the foregoing computing device to recognize the dangerous driving behaviors of the driver in the driver image. Reference may be made to the foregoing description, and details are not described herein again.

In some embodiments, the duration of the first time period is the duration of the first in-vehicle camera or the second in-vehicle camera collecting the driver image.

In the embodiment of the disclosure, there is no sequence between obtaining the dangerous driving behavior data and obtaining the foregoing correspondence. That is to say, the computing device may first obtain the dangerous driving behavior data, and then obtain the correspondence, or may also first obtain the correspondence, and then obtain the dangerous driving behavior data, or may also simultaneously obtain the dangerous driving behavior data and the correspondence.

In some embodiments, the correspondence between the quantity of occurrences of the dangerous driving behaviors and the actual quantity of occurrences of the dangerous scenarios may be generated in advance. When giving a driving risk warning, the computing device may directly obtain the generated correspondence, so that the time and computing resources consumed by generating the correspondence are avoided, thereby realizing timely warning of driving risk. For example, the computing device generates the correspondence once a day. In this way, within one day after the correspondence is generated, the correspondence may be directly used in the driving risk warning process.

In some embodiments, the foregoing correspondence may be generated by the computing device when obtaining the dangerous driving behavior data. For example, the computing device obtains the dangerous driving behavior data of the driver in the first time period, and in response to the obtained dangerous driving behavior data, the computing device starts to generate the correspondence.

Since most traffic accidents are caused by human factors, there is a correlation between the quantity of occurrences of the dangerous driving behaviors of the driver and the quantity of occurrences of the dangerous scenarios. Based on this, the embodiment of the disclosure obtains the correspondence between the quantity of occurrences of the dangerous driving behaviors and the actual quantity of occurrences of the dangerous scenarios. The correspondence may truly reflect the relationship between the quantity of occurrences of the actual occurrence of the dangerous scenario and the quantity of occurrences of the dangerous driving behaviors made by the driver before the driver encounters the dangerous scenario. Based on the correspondence, one or more dangerous scenarios that may be caused by the dangerous driving behaviors of the driver are accurately predicted, thereby improving the accuracy of the warning of driving risk.

In the embodiment of the disclosure, the foregoing correspondence may be generated based on the historical dangerous driving behavior data and the historical dangerous scenario data of the driver who currently drives the vehicle. In an embodiment, the foregoing correspondence may further be generated based on the historical dangerous driving behavior data and the historical dangerous scenario data of another driver, two or more other drivers, and/or a plurality of drivers including the driver who currently drives the vehicle.

S302: Predict a target quantity of times for which the driver encounters different dangerous scenarios in the first time period according to a quantity of an actual occurrence of the dangerous driving behaviors involved in the dangerous driving behavior data and the correspondence.

For example, assuming that the current time period is 10 s, 1000 driver images are collected in this 10 s, and the 1000 driver images are analyzed, and the obtained dangerous driving behavior data is: 10 fatigue driving and 5 distracted driving. In this way, it is obtained that the quantity of occurrences of the fatigued driving is 10 and the quantity of occurrences of the distracted driving is 5. The computing device predicts the target quantity of times for which the driver encounters the different dangerous scenarios in the first time period according to the quantity of occurrences of the dangerous driving behaviors involved in the dangerous driving behavior data and the correspondence.

In some embodiments, a quantity of occurrences for which the driver encounters each dangerous scenario in the first time period t may be determined through the following formula (1):

$$C_{N \times M} \begin{pmatrix} b_{1,t} \\ b_{2,t} \\ ... \\ b_{M,t} \end{pmatrix} = \begin{pmatrix} a_{1,t} \\ a_{2,t} \\ ... \\ a_{N,t} \end{pmatrix} \quad (1)$$

where $C_{N \times M}$ is a correspondence between the quantity of occurrences of the dangerous driving behaviors and the actual quantity of occurrences of the dangerous scenarios, and $C_{N \times M}$ is a matrix with N rows and M columns. $b_{i,t}$ is the quantity of occurrences of the ith dangerous driving behavior of the driver in the time period t, and i is greater than or equal to 1 and less than or equal to M. $a_{j,t}$ is the predicted quantity of occurrences for which the driver encounters the jth dangerous scenario in the time period t, and j is greater than or equal to 1 and less than or equal to N.

In combination with the foregoing example, taking t as the current time period, and the driver has dangerous driving behaviors of 10 fatigue driving and 5 distracted driving in the current time period, with reference to Table 1, it may be determined that $b_{1,t}=10$ and $b_{1,t}=5$, and others are 0. In this way, by bringing $b_{1,t}=10$ and $b_{4,t}=5$ into the foregoing formula (1), it may be predicted that the target quantity of times for which the driver encounters different dangerous scenarios in the first time period are $a_{1,t}$, $a_{2,t}$ to $a_{N,t}$ respectively.

For example, it is assumed that the foregoing M and N are both 4, that is, including four dangerous driving behaviors, being fatigue driving, not wearing a seat belt, drunk driving and distracted driving in Table 1, and four dangerous scenarios, being lane departure, pedestrian collision, front collision and safe vehicle distance in Table 2. It is assumed that the dangerous driving behaviors of 10 fatigue driving and 5 distracted driving of the driver are obtained from the dangerous driving behavior data in the first time period, and not wearing a seat belt and drunk driving do not occur, then $b_{1,t}=10$, $b_{4,t}=5$, $b_{2,t}$ and $b_{3,t}$ are all 0. In this way, by bringing $b_{1,t}=10$ and $b_{4,t}=5$ into the foregoing formula (1), the following results may be obtained:

$$\begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix} \begin{pmatrix} 10 \\ 0 \\ 0 \\ 5 \end{pmatrix} = \begin{pmatrix} a_{1,t} \\ a_{2,t} \\ a_{3,t} \\ a_{4,t} \end{pmatrix}$$

At this time, the correspondence between the quantity of occurrences of the dangerous driving behaviors and the actual quantity of occurrences of the dangerous scenarios $C_{N \times M}$ is a matrix with 4 rows and 4 columns, that is $$C_{4 \times 4} = \begin{bmatrix} c_{11} & c_{12} & c_{13} & c_{14} \\ c_{21} & c_{22} & c_{23} & c_{24} \\ c_{31} & c_{32} & c_{33} & c_{34} \\ c_{41} & c_{42} & c_{43} & c_{44} \end{bmatrix},$$

and in which each parameter is known. $a_{1,t}$ is a quantity of occurrences of lane departure, $a_{2,t}$ is a quantity of occurrences of pedestrian collision, $a_{3,t}$ is a quantity of occurrences of front collision and $a_{4,t}$ is a quantity of occurrences of safe vehicle distance.

In this way, it may be predicted that a target quantity of times for which the driver may encounter the lane departure in the first time period is $a_{1,t}=c_{11} \times 10 + c_{14} \times 5$, a target quantity of times for which the driver may encounter the pedestrian collision in the first time period is $a_{2,t}=c_{21} \times 10 + c_{24} \times 5$, a target quantity of times for which the driver may encounter the front collision in the first time period is $a_{3,t}=c_{31} \times 10 + c_{34} \times 5$, and a target quantity of times for which the driver may encounter the safe vehicle distance in the first time period is $a_{4,t}=c_{41} \times 10 + c_{44} \times 5$.

S303: Generate warning information according to the target quantity of times.

In the embodiment of the disclosure, the warning information is generated through the target quantity of times for which the driver encounters each dangerous scenario in the first time period, so that the driver may clearly learn what kind of serious consequences his dangerous driving behaviors may cause through the warning. This result-oriented warning method has an intuitive prompt, which may effectively improve the efficiency of human-computer interaction and achieve the purpose of regulating driving behaviors.

Figure 5:
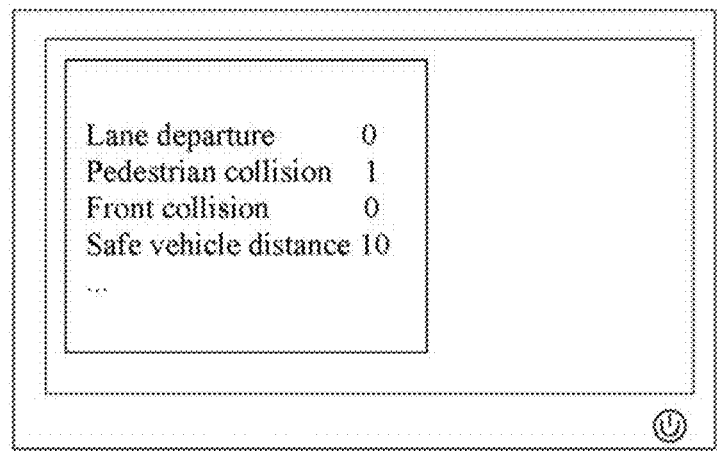
FIG. 5 is a schematic diagram of warning information involved in an embodiment of the disclosure.

In the embodiment of the disclosure, the manners in which the warning information is generated according to the target quantity of times include but are not limited to the following:

Manner 1: Warning information includes a target quantity of times for which a driver may encounter different dangerous scenarios in a first time period. As shown in FIG. 5, the warning information includes predicting a target quantity of times for which the driver may respectively encounter N types of the dangerous scenarios in the current time period.

In an implementation, a target quantity of times corresponding to each dangerous scenario in the warning information may be sorted according to the quantity of occurrences.

In an implementation, the warning information may include a dangerous scenario with a target quantity of times not being 0, but do not include a dangerous scenario with a target quantity of times being 0.

Figure 6:
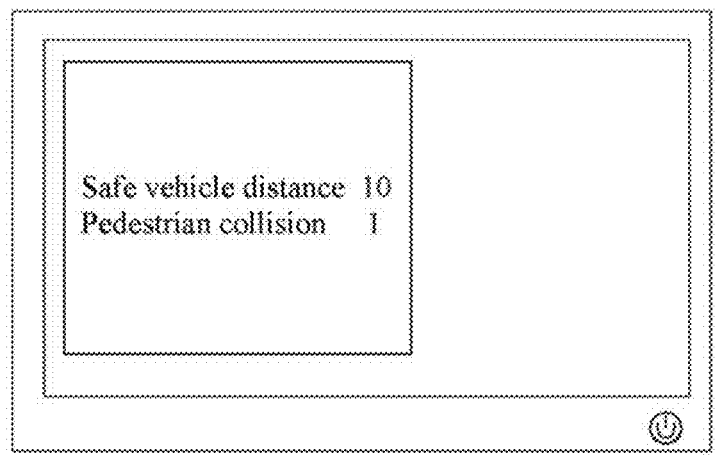
FIG. 6 is another schematic diagram of warning information involved in an embodiment of the disclosure.

Manner 2: Warning information includes one or more dangerous scenarios in which the predicted target quantity of times of the driver in the first time period is not 0. As shown in FIG. 6, the warning information includes two dangerous scenarios of safe vehicle distance and pedestrian collision. A predicted target quantity of times for which the driver has the dangerous scenario of safe vehicle distance in the first time period is 10 and a predicted target quantity of times for which the driver has the dangerous scenario of pedestrian collision is 1.

After the warning information is generated according to the foregoing method, the computing device sends the generated warning information to the warning system, and the warning system outputs the warning information to the driver, so that the driver may drive safely according to the warning information.

In an embodiment, if the computing device has a display function or a voice prompt function, the computing device may further directly output the warning information to the driver.

The warning method for a driving risk provided in the embodiment of the disclosure obtains the dangerous driving behavior data of the driver in the first time period, and obtains the correspondence between the quantity of occurrences of the dangerous driving behaviors and the actual quantity of occurrences of the dangerous scenarios. The correspondence may truly reflect the relationship between the quantity of occurrences of the actual occurrence of the dangerous scenario and the quantity of occurrences of the dangerous driving behaviors made by the driver before the driver encounters the dangerous scenario. Therefore, the target quantity of times for which the driver may encounter different dangerous scenarios in the first time period may be accurately predicted through the correspondence and the quantity of occurrences of the dangerous driving behaviors involved in the dangerous driving behavior data and the risk warning is given to the driver based on the warning information generated by the target quantity of times. Because the warning information is determined according to the dangerous scenarios that may be caused by the dangerous driving behaviors of the driver, the driver may clearly learn what kind of serious consequences his dangerous driving behaviors may cause through the warning. This result-oriented warning method has an intuitive prompt, which may effectively improve the efficiency of human-computer interaction and achieve the purpose of regulating driving behaviors.

On the basis of the foregoing embodiments, an example process of obtaining the correspondence between the quantity of occurrences of the dangerous driving behaviors and the actual quantity of occurrences of dangerous scenarios in the foregoing S301 is described below in detail with reference to FIG. 7.

Figure 7:
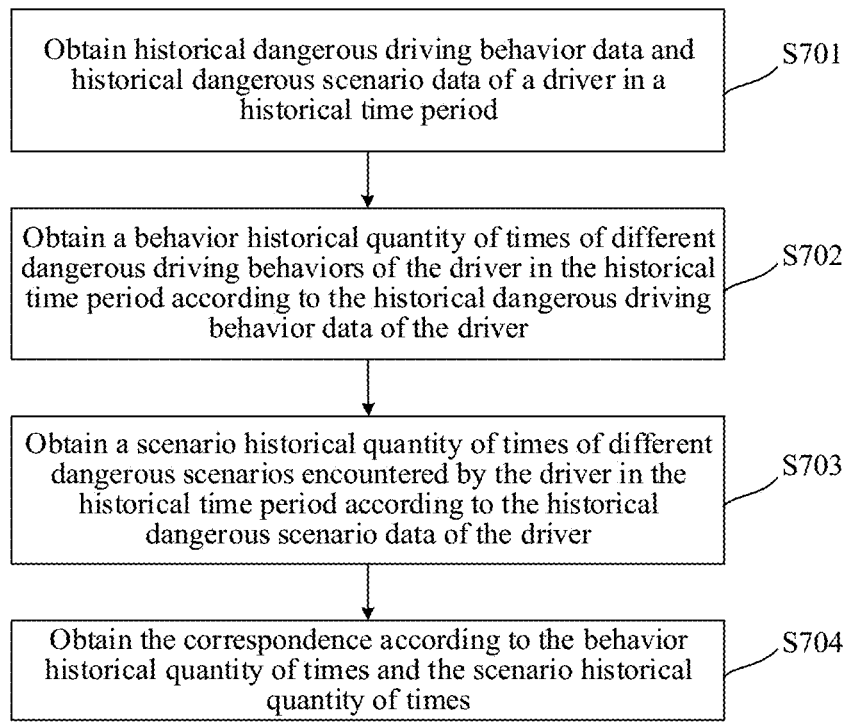
FIG. 7 is another schematic flowchart of a warning method for a driving risk according to an embodiment of the disclosure.

FIG. 7 is another schematic flowchart of a warning method for a driving risk according to an embodiment of the disclosure. As shown in FIG. 7, obtaining the correspondence between the quantity of occurrences of the dangerous driving behaviors and the actual quantity of occurrences of the dangerous scenarios in the foregoing S301 may include S701-S704:

S701: Obtain historical dangerous driving behavior data and historical dangerous scenario data of a driver in a historical time period.

The historical dangerous driving behavior data includes dangerous driving behaviors actually taken by the driver in the historical time period. The historical dangerous scenario data includes dangerous scenarios actually encountered by the driver in the historical time period.

The foregoing preset historical time period may be a historical time period closest to the current moment, for example, the preset historical time period is the first three months of the first time period.

In some embodiments, if the historical dangerous driving behavior data is saved in the in-vehicle camera shown in FIG. 2, the computing device may obtain the historical dangerous driving behavior data of the driver in the preset historical time period from the in-vehicle camera.

In some embodiments, if the dangerous driving behavior data is saved in the storage apparatus of the computing device shown in FIG. 2, the computing device may obtain the historical dangerous driving behavior data of the driver in the preset historical time period from the its own storage device.

In some embodiments, if the historical dangerous scenario data is saved in the warning system shown in FIG. 2, the computing device may obtain the historical dangerous scenario data of the driver in the preset historical time period from the warning system.

S702: Obtain a behavior historical quantity of times of different dangerous driving behaviors of the driver in the historical time period according to the historical dangerous driving behavior data of the driver.

Specifically, the computing device may obtain a behavior historical quantity of times of each of the M types of the dangerous driving behaviors of the driver in the historical time period according to the historical dangerous driving behavior data of the driver, as shown in Table 3:

TABLE 3

| Types of the dangerous driving behaviors | Names of the dangerous driving behaviors | Behavior historical quantity of times |
|---|---|---|
| First type of the dangerous driving behaviors | Fatigue driving | b1 |
| Second type of the dangerous driving behaviors | Not wearing a seat belt | b2 |
| Third type of the dangerous driving behaviors | Drunk driving | b3 |
| Fourth type of the dangerous driving behaviors | Distracted driving | b4 |
| ... | ... | ... |

As shown in Table 3, the behavior historical quantity of times of the various dangerous driving behaviors of the driver in the historical time period is displayed on the right column. For example, a behavior historical quantity of times of the second type of the dangerous driving behaviors of the driver in the historical time period is b2.

S703: Obtain a scenario historical quantity of times of different dangerous scenarios encountered by the driver in the historical time period according to the historical dangerous scenario data of the driver.

Similarly, the computing device may obtain a scenario historical quantity of times for which the driver actually encounters each of the N types of the dangerous scenarios in the historical time period according to the historical dangerous scenario data of the driver, as shown in Table 4:

TABLE 4

| Types of the dangerous scenarios | Names of the dangerous scenarios | Scenario historical quantity of times |
|---|---|---|
| First type of the dangerous scenarios | Lane departure | a1 |
| Second type of the dangerous scenarios | Pedestrian collision | a2 |
| Third type of the dangerous scenarios | Front collision | a3 |
| Fourth type of the dangerous scenarios | Safe vehicle distance | a4 |
| ... | ... | ... |

As shown in Table 4, the scenario historical quantity of times for which the driver actually encounters the various dangerous scenarios in the historical time period is displayed on the right column. For example, a scenario historical quantity of times for which the driver actually encounters the second type of the dangerous scenarios in the historical time period is a2.

S704: Obtain the correspondence according to the behavior historical quantity of times and the scenario historical quantity of times.

In some embodiments, if there is a linear mapping relationship between the quantity of occurrences of the dangerous driving behaviors and the actual quantity of occurrences of the dangerous scenarios in the correspondence, the linear mapping relationship is as shown in formula (2):

$$C_{N \times M} \begin{pmatrix} b_1 \\ b_2 \\ ... \\ b_M \end{pmatrix} = \begin{pmatrix} a_1 \\ a_2 \\ ... \\ a_N \end{pmatrix} \quad (2)$$

In formula (2), $a_1$, $a_2$ to $a_N$ are the scenario historical quantity of times for which the driver encounters the different types of dangerous scenarios in Table 4 in the historical time period, and $b_1$, $b_2$ to $b_M$ are the behavior historical quantity of times of the different types of dangerous driving behaviors in Table 3 of the driver in the historical time period.

By bringing the data in Table 3 and Table 4 into the formula (2), the matrix $C_{N \times M}$ can be obtained, and the matrix $C_{N \times M}$ is used as the correspondence between the quantity of occurrences of the dangerous driving behaviors and the actual quantity of occurrences of the dangerous scenarios.

In some embodiments, if there is a linear mapping relationship between the actual quantity of occurrences of the dangerous scenarios and the quantity of occurrences of the dangerous driving behaviors in the correspondence, the linear mapping relationship is as shown in formula (3):

$$A_{M \times N} \begin{pmatrix} a_1 \\ a_2 \\ ... \\ a_N \end{pmatrix} = \begin{pmatrix} b_1 \\ b_2 \\ ... \\ b_M \end{pmatrix} \quad (3)$$

In formula (3), $a_1$, $a_2$ to $a_N$ are the scenario historical quantity of times for which the driver encounters the different types of dangerous scenarios in Table 4 in the historical time period, and $b_1$, $b_2$ to $b_M$ are the behavior historical quantity of times of the different types of dangerous driving behaviors in Table 3 of the driver in the historical time period.

By bringing the data in Table 3 and Table 4 into the formula (3), the matrix $A_{M \times N}$ can be obtained, and the matrix $A_{M \times N}$ is used as the correspondence between the quantity of occurrences of the dangerous driving behaviors and the actual quantity of occurrences of the dangerous scenarios. The matrix $A_{M \times N}$ may be understood as a deformation of the matrix $C_{N \times M}$.

When solving the matrices $A_{M \times N}$ and $C_{N \times M}$, there may be a case in which the solution is not unique, and any solution may be selected in this case. In other cases, there may be non-convergence in the process of solving. In this case, the solution with the smallest norm may be selected as the solution of the matrix. For the norm, any type of the norm may be selected, for example, the 2-norm may be selected.

On the basis of the foregoing embodiment, an implementation of generating warning information according to the predicted quantity of occurrences for which the driver encounters each dangerous scenario in the current time period in the foregoing S303 will be described in detail below with reference to FIG. 8.

Figure 8:
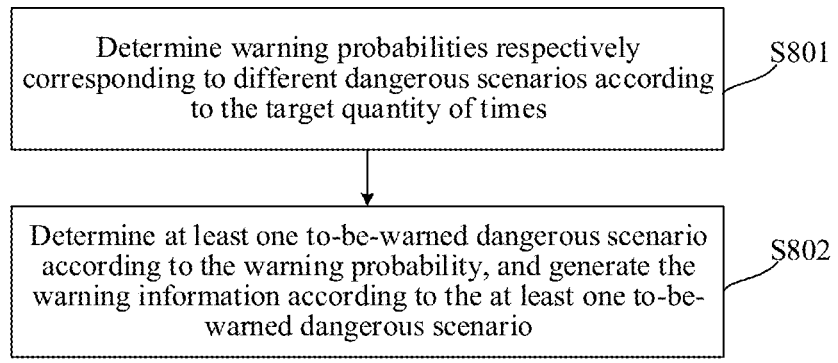
FIG. 8 is another schematic flowchart of a warning method for a driving risk according to an embodiment of the disclosure.

FIG. 8 is another schematic flowchart of a warning method for a driving risk according to an embodiment of the disclosure. As shown in FIG. 8, generating the warning information according to the target quantity of times in the foregoing S303 may include S801-S802:

S801: Determine warning probabilities respectively corresponding to different dangerous scenarios according to the target quantity of times.

Specifically, Referring to the foregoing formula (1), according to the actual quantity of occurrences of the dangerous driving behaviors of the driver in the first time period, the target quantity of times for which the driver encounters the different dangerous scenarios in the first time period is predicted as: $a_{1,t}$, $a_{2,t}$, $a_{3,t}$, $a_{N,t}$.

Then, warning probabilities respectively corresponding to the different dangerous scenarios are determined according to the target quantity of times. For example, according to formula (4), a warning probability of each dangerous scenario may be determined:

$$p_j = a_{j,t} / (a_{1,t} + a_{2,t} + \ldots + a_{N,t}) \qquad (4)$$

where $p_j$ is a warning probability of the jth dangerous scenario, $a_{j,t}$ is a predicted target quantity of times for which the driver encounters the jth dangerous scenario in the time period t, and j is greater than or equal to 1 and less than or equal to N. At this time, t is the first time period.

In this step, a warning probability of each dangerous scenario in the first time period may be determined according to the foregoing formula (4).

S802: Determine at least one dangerous scenario for warning according to the warning probability, and generate the warning information according to the at least one dangerous scenario for warning.

The warning information includes at least one dangerous scenario to be warned against.

In some embodiments, one or several dangerous scenarios with the highest warning probability are determined as the dangerous scenario for warning.

In some embodiments, to make the dangerous scenarios with a warning probability not being 0 have an equal chance to be warned about, at least one dangerous scenario for warning is determined according to the warning probability of each dangerous scenario in the foregoing S802, including step A and step B.

Step A: Generate a random number.

In an embodiment, the random number obeys a 0-1 uniform distribution.

Step B: Determine at least one dangerous scenario for warning according to the warning probabilities respectively corresponding to different dangerous scenarios and the random number.

Determining the at least one dangerous scenario for warning according to the warning probability of each dangerous scenario and the random number includes the following two cases:

Case 1: Determine a (k+1)th dangerous scenario as the dangerous scenario for warning in a case that the random number is greater than a sum of the warning probabilities of first k dangerous scenarios and less than or equal to a sum of the warning probabilities of first k+1 dangerous scenarios.

Specifically, referring to formula (5):

$$\Sigma_{j=1}^{k} p_j < \theta \leq \Sigma_{j=1}^{k+1} p_j \qquad (5)$$

$\theta$ is a random number, $\Sigma_{j=1}^{k} p_j$ is a sum of the warning probabilities of the first k dangerous scenarios, $\Sigma_{j=1}^{k+1} p_j$ is a sum of the warning probabilities of the first k+1 dangerous scenarios, and k is a positive integer greater than or equal to 1 and less than or equal to N.

When the random number $\theta$ satisfies the foregoing formula (5), the (k+1)th dangerous scenario is regarded as the dangerous scenario for warning. For example, if $\theta=0.5$, $p_1=0.1$, $p_2=0.3$, $p_3=0.2$, $\theta$ is greater than the sum of $p_1$ and $p_2$ (that is, 0.4), and less than the sum of $p_1$, $p_2$ and $p_3$ (that is, 0.6), it may be determined that k=2, and the third type of the dangerous scenarios (that is, the front collision in Table 2) is determined as the dangerous scenario for warning.

Case 2: Determine a kth dangerous scenario as the dangerous scenario for warning in a case that the random number is greater than a first numerical value, and less than or equal to the sum of the warning probabilities of the first k dangerous scenarios;

Specifically, if k is greater than 1, referring to formula (6):

$$\Sigma_{j=1}^{k-1} p_j < \theta \leq \Sigma_{j=1}^{k} p_j \qquad (6)$$

When the random number $\theta$ satisfies the foregoing formula (6), the (k+1)th dangerous scenario is regarded as the dangerous scenario for warning. For example, if $\theta=0.2$, $p_1=0.1$, $p_2=0.3$, $p_3=0.2$, $\theta$ is less than the sum of $p_1$ and $p_2$ (that is, 0.4), and greater than $p_1$, the second type of the dangerous scenarios (that is, the pedestrian collision in Table 2) is determined as the dangerous scenario for warning.

If k is equal to 1, referring to formula (7):

$$0 < \theta \leq \Sigma_{j=1}^{k} p_j \qquad (7)$$

when the random number $\theta$ satisfies the foregoing formula (7), the kth dangerous scenario is regarded as the dangerous scenario for warning. For example, if $\theta=0.1$, $p_1=0.2$, $p_2=0.3$, $p_3=0.2$, $\theta$ is less than $p_1$ (that is, 0.2) and greater than 0, the first type of the dangerous scenarios (that is, the lane departure in Table 2) is determined as the dangerous scenario for warning.

In some embodiments of the embodiments of the disclosure, If the foregoing dangerous scenario for warning includes a plurality of dangerous scenarios, after each time a dangerous scenario for warning is determined, the warning probability of the determined dangerous scenario for warning is eliminated from the warning probabilities of the foregoing dangerous scenarios. Warning probabilities of the remaining dangerous scenarios is normalized, and the warning probabilities of the remaining dangerous scenarios is re-determined. At the same time, the random number is re-determined, and the re-determined random number and the re-determined warning probability of each dangerous scenario are used for executing the foregoing formula (5) or formula (6) or formula (7) to determine the dangerous scenario for warning.

For example, assuming that there are two dangerous scenarios for warning, the computing device first generates a random number θ1, and determines a warning probability of each dangerous scenario of the N dangerous scenarios according to the foregoing formula (4). Next, according to the foregoing formula (5) or formula (6) or formula (7), a dangerous scenario 1 for warning is determined. Next, the warning probability of the dangerous scenario 1 is eliminated from the warning probabilities of the foregoing N dangerous scenarios, and warning probabilities of the remaining N−1 dangerous scenarios is normalized to re-determine a warning probability of each of the N−1 dangerous scenarios. At the same time, a random number θ2 is generated, and the random number θ2 and the warning probabilities of the N−1 dangerous scenarios are brought into the formula (5) or formula (6) or formula (7) to determine a dangerous scenario 2 for warning.

In the warning method for a driving risk provided in the embodiments of the disclosure, the warning probability of each dangerous scenario is determined according to the predicted quantity of times for which the driver encounters each dangerous scenario in the current time period. According to the warning probability of each dangerous scenario, at least one dangerous scenario for warning is determined, and the determined dangerous scenario for warning is carried in the warning information. In this way, the driver may directly obtain the dangerous scenario that may happen at present through the warning information, so that the driver may take timely measures to improve the safety of vehicle driving.

The embodiments shown in FIG. 3 to FIG. 8 above describe the warning method for dangerous driving provided in the embodiments of the disclosure in detail. The technical effect of the embodiments of the disclosure is further described below with reference to experimental results. Specifically, a text is carried out in a simulator to obtain a ratio of a missing alarm rate of the disclosure to that of the related art, and a ratio of a false alarm rate of the disclosure to that of the related art, as shown in Table. 5.

TABLE 5

| Experiment number | a ratio of a false alarm rate of the disclosure to that of the related art | a ratio of a missing alarm rate of the disclosure to that of the related art |
| --- | --- | --- |
| First experiment | 0.81 | 0.85 |
| Second experiment | 0.80 | 0.83 |
| Third experiment | 0.85 | 0.87 |
| Fourth experiment | 0.83 | 0.88 |
| Fifth experiment | 0.82 | 0.83 |
| Sixth experiment | 0.83 | 0.85 |
| Seventh experiment | 0.85 | 0.84 |
| Eighth experiment | 0.84 | 0.89 |
| Ninth experiment | 0.81 | 0.82 |
| Tenth experiment | 0.82 | 0.83 |

The false warning may be understood as a warning being given when it should not have been, and the missing warning may be understood as a warning not being given when it should have been. As shown in Table 5, compared with an existing warning method, the warning method of the embodiments of the disclosure has a lower false alarm rate and a lower missing alarm rate, and compared with the existing warning method, the warning method of the embodiments of the disclosure significantly improves the accuracy of warning.

On the basis of the foregoing embodiments, the embodiments of the disclosure further provide a prediction method for dangerous driving behaviors.

Figure 9:
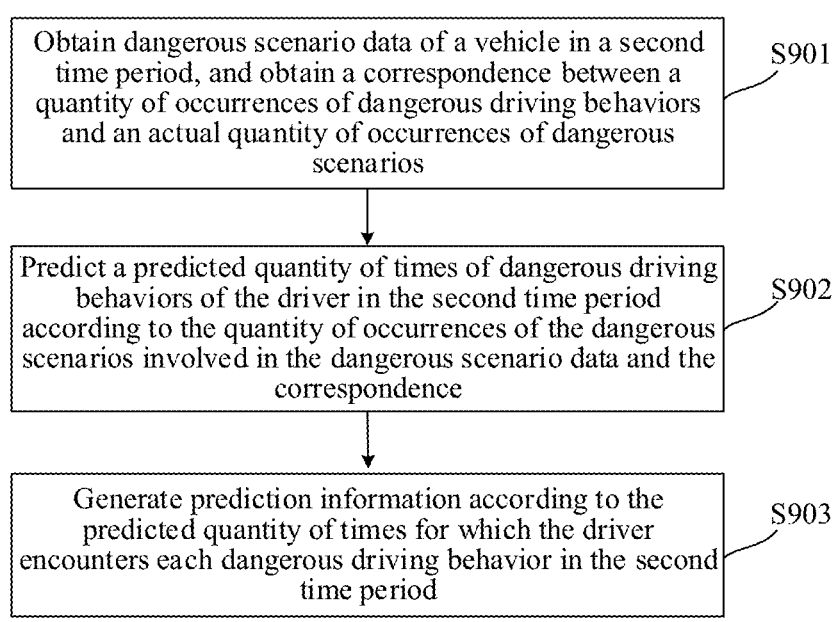
FIG. 9 is a schematic flowchart of a prediction method for dangerous driving behaviors according to an embodiment of the disclosure.

FIG. 9 is a schematic flowchart of a prediction method for dangerous driving behaviors according to an embodiment of the disclosure. As shown in FIG. 9, the method of the embodiment of the disclosure includes S901-S903:

S901: Obtain dangerous scenario data of a vehicle in a second time period, and obtain a correspondence between a quantity of occurrences of dangerous driving behaviors and a quantity of an actual occurrence of dangerous scenarios.

The prediction method for dangerous driving behaviors provided in the embodiment of the disclosure may be applied to a liability confirmation process for traffic accidents. For example, a dangerous driving behavior that the driver may have in the second time period is predicted according to the dangerous scenario occurring in the vehicle in the second time period.

The foregoing second time period may be the first time period or any historical time period, or may further be a time period after the first time period and adjacent to the first time period.

In the embodiments of the disclosure, the manners in which the dangerous scenario data of the vehicle in the second time period is obtained include but not limited to the following:

Manner 1: A camera is installed on the vehicle to capture an external environment of the vehicle, such as a tachograph. Driving environment images of the vehicle in the second time period are obtained from the camera, and the driving environment images are analyzed to obtain dangerous scenario data of the vehicle in the second time period.

Manner 2: The driving environment images of the vehicle in the second time period may be obtained from a roadside device, for example, from cameras installed on both sides of the road, and the driving environment images are analyzed to obtain dangerous scenario data of the vehicle in the second time period.

In an embodiment, the first dangerous scenario data includes the dangerous scenarios occurring in the vehicle in the second time period, and the quantity of occurrences of each dangerous scenario.

In the embodiment of the disclosure, there is no sequence between obtaining the dangerous scenario data and obtaining the correspondence between the quantity of occurrences of the dangerous driving behaviors and the actual quantity of occurrences of the dangerous scenarios. That is to say, the computing device may first obtain the dangerous scenario data, and then obtain the correspondence, or may also first obtain the correspondence, and then obtain the dangerous scenario data, or may also simultaneously obtain the dangerous scenario data and the correspondence.

In an embodiment, the foregoing correspondence may be generated in advance, or may be triggered and generated when the computing device obtains the dangerous scenario data.

S902: Predict a predicted quantity of times of dangerous driving behaviors of the driver in the second time period according to the quantity of occurrences of the dangerous scenarios involved in the dangerous scenario data and the correspondence.

In some embodiments, a quantity of occurrences of each dangerous scenario in the second time period may be determined through the following formula (8):

$$\begin{pmatrix} b_{1,t} \\ b_{2,t} \\ \ldots \\ b_{M,t} \end{pmatrix} = A_{M \times N} \begin{pmatrix} a_{1,t} \\ a_{2,t} \\ \ldots \\ a_{N,t} \end{pmatrix} \quad (8)$$

where $A_{M \times N}$ is the correspondence between the quantity of occurrences of the dangerous driving behaviors and the actual quantity of occurrences of the dangerous scenarios, and $A_{M \times N}$ is a matrix with M rows and N columns. $b_{i,t}$ is the quantity of occurrences of the ith dangerous driving behavior of the driver in the second time period t, and i is greater than or equal to 1 and less than or equal to M. $a_{j,t}$ is the quantity of occurrences for which the driver encounters the jth dangerous scenario in the second time period t, and j is greater than or equal to 1 and less than or equal to M.

In combination with the foregoing example, taking t as the second time period, the dangerous scenarios occurring in the vehicle in the second time period are: 10 lane departure and 2 front collision, with reference to Table 2, it can be determined that $a_{1,t}=10$, $a_{3,t}=2$, and others are 0. In this way, by bringing $a_{1,t}=10$ and $a_{3,t}=2$ into the foregoing formula (8), the quantity of occurrences of each dangerous driving behavior of the driver in the second time period may be predicted.

S903: Generate prediction information according to the predicted quantity of times for which the driver encounters each dangerous driving behavior in the second time period.

The prediction information is used for indicating the possible dangerous driving behavior the driver may have in the second time period.

In some embodiments, the prediction information includes the predicted quantity of times for which the driver encounters each dangerous driving behavior in the second time period in the foregoing S902.

In some embodiments, the warning information includes one or more dangerous driving behaviors with a predicted quantity of occurrences not being 0, for example, the prediction information includes the predicted most frequent dangerous driving behavior.

In the prediction method for dangerous driving behaviors provided in the embodiments of the disclosure, through obtaining the dangerous scenario data of the driver in the second time period and obtaining the correspondence between the quantity of occurrences of the dangerous driving behaviors and the actual quantity of occurrences of the dangerous scenarios, the correspondence may truly reflect the relationship between the quantity of occurrences of the dangerous driving behaviors and the quantity of occurrences of the dangerous scenarios. In this way, the possible dangerous driving behaviors of the driver in the second time period may be accurately predicted according to the correspondence and the quantity of occurrences of each dangerous scenario in the dangerous scenario data.

Figure 10:
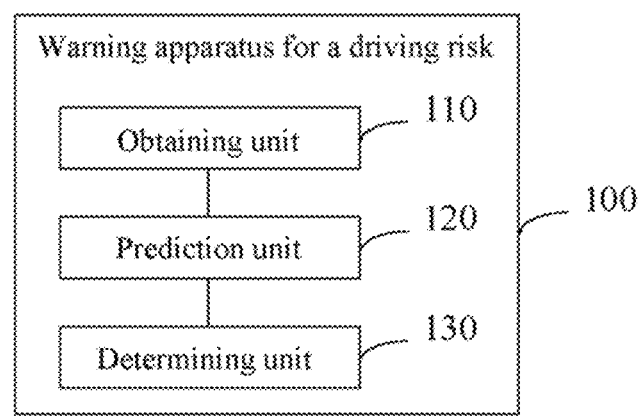
FIG. 10 is a schematic diagram of a structure of a warning apparatus for a driving risk according to an embodiment of the disclosure.

FIG. 10 is a schematic diagram of a structure of a warning apparatus for a driving risk according to an embodiment of the disclosure. The warning apparatus may be an electronic device, or may be components of the electronic device (such as an integrated circuit and a chip). The electronic device may be the computing device shown in FIG. 2. As shown in FIG. 10, the warning apparatus 100 may include: an obtaining unit 110, a prediction unit 120 and a determining unit 130.

The obtaining unit 110 is configured to obtain dangerous driving behavior data of a driver in a first time period, and obtain a correspondence between a quantity of occurrences of the dangerous driving behaviors and a quantity of an actual occurrence of dangerous scenarios.

The prediction unit 120 is configured to predict a target quantity of times for which the driver encounters different dangerous scenarios in the first time period according to a quantity of an actual occurrence of the dangerous driving behaviors involved in the dangerous driving behavior data and the correspondence.

The determining unit 130 is configured to generate warning information according to the target quantity of times.

The warning apparatus for a driving risk of the embodiments of the disclosure may be configured to perform the technical solutions of the foregoing method embodiments. The implementation principle is similar to the technical effect, which is not described in detail herein.

In an example embodiment, the foregoing obtaining unit 110 is further configured to obtain the historical dangerous driving behavior data and the historical dangerous scenario data of the driver in the historical time period; determine the behavior historical quantity of times of the different dangerous driving behaviors of the driver in the historical time period according to the historical dangerous driving behavior data of the driver, and determine the scenario historical quantity of times of different dangerous scenarios encountered by the driver in the historical time period according to the historical dangerous scenario data of the driver; and obtain the correspondence according to the behavior historical quantity of times and the scenario historical quantity of times.

In an embodiment, the warning information includes the predicted target quantity of times for which the driver encounters each dangerous scenario in the current time period.

In an example embodiment, the foregoing determining unit 130 is further configured to determine warning probabilities respectively corresponding to different dangerous scenarios according to the target quantity of times. At least one dangerous scenario for warning is determined according to the warning probabilities, and the warning information is generated according to the at least one dangerous scenario for warning.

In an example embodiment, the foregoing determining unit 130 is further configured to generate a random number. The at least one dangerous scenario for warning is determined according to the warning probabilities respectively corresponding to different dangerous scenarios and the random number.

In an example embodiment, the foregoing determining unit 130 is further configured to determine a (k+1)th dangerous scenario as the dangerous scenario for warning in a case that the random number is greater than a sum of the warning probabilities of first k dangerous scenarios and less than or equal to a sum of the warning probabilities of first k+1 dangerous scenarios; and determining a kth dangerous scenario as the dangerous scenario for warning in a case that the random number is greater than a first numerical value, and less than or equal to the sum of the warning probabilities of the first k dangerous scenarios; where the first numerical value is a sum of the warning probabilities of first k−1 dangerous scenarios in a case that k is greater than 1, and the first numerical value is 0 in a case that k is equal to 1.

In an example embodiment, the foregoing obtaining unit 110 is further configured to obtain a driver image collected by a first in-vehicle camera in a first time period; recognize a quantity of an actual occurrence of different types of dangerous driving behaviors in the driver image according to types of the dangerous driving behaviors; and obtain dangerous driving behavior data according to the actual quantity of occurrences.

In an example embodiment, the foregoing obtaining unit 110 is further configured to obtain the dangerous driving behavior data of the driver in the first time period from a second in-vehicle camera, the second in-vehicle camera being configured to collect the driver image, and generate the dangerous driving behavior data by performing dangerous driving behavior recognition on the collected driver image according to the types of the dangerous driving behaviors.

In an embodiment, the duration of the current time period is the duration of the first in-vehicle camera collecting the driver image.

The warning apparatus for a driving risk of the embodiments of the disclosure may be configured to perform the technical solutions of the foregoing method embodiments. The implementation principle is similar to the technical effect, which is not described in detail herein.

Figure 11:
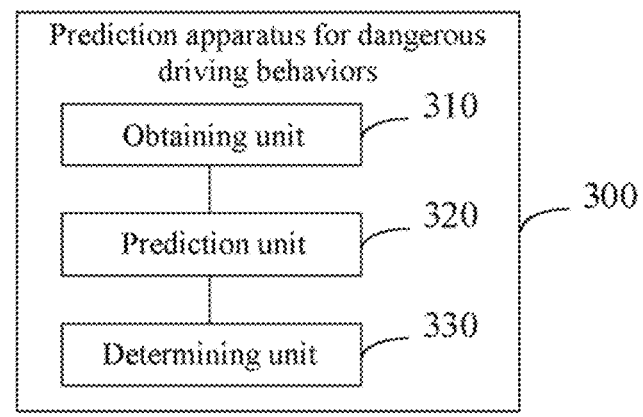
FIG. 11 is a schematic diagram of a structure of a prediction apparatus for dangerous driving behaviors according to an embodiment of the disclosure.

FIG. 11 is a schematic diagram of a structure of a prediction apparatus for dangerous driving behaviors according to an embodiment of the disclosure. The prediction apparatus may be an electronic device, or may be components of the electronic device (such as an integrated circuit and a chip). The electronic device may be the computing device shown in FIG. 2. As shown in FIG. 11, the prediction apparatus 300 may include: an obtaining unit 310, a prediction unit 320 and a determining unit 330.

The obtaining unit 310 is configured to obtain dangerous scenario data of a vehicle in a second time period.

The prediction unit 320 is configured to predict a predicted quantity of times of dangerous driving behaviors of the driver in the second time period according to the quantity of occurrences of the dangerous scenarios involved in the dangerous scenario data and the correspondence.

The determining unit 330 is configured to generate prediction information according to the prediction quantity of times.

The prediction apparatus for dangerous driving behaviors of the embodiments of the disclosure may be configured to perform the technical solutions of the foregoing prediction method embodiments of dangerous driving behaviors. The implementation principle is similar to the technical effect, which is not described in detail herein.

Figure 12:
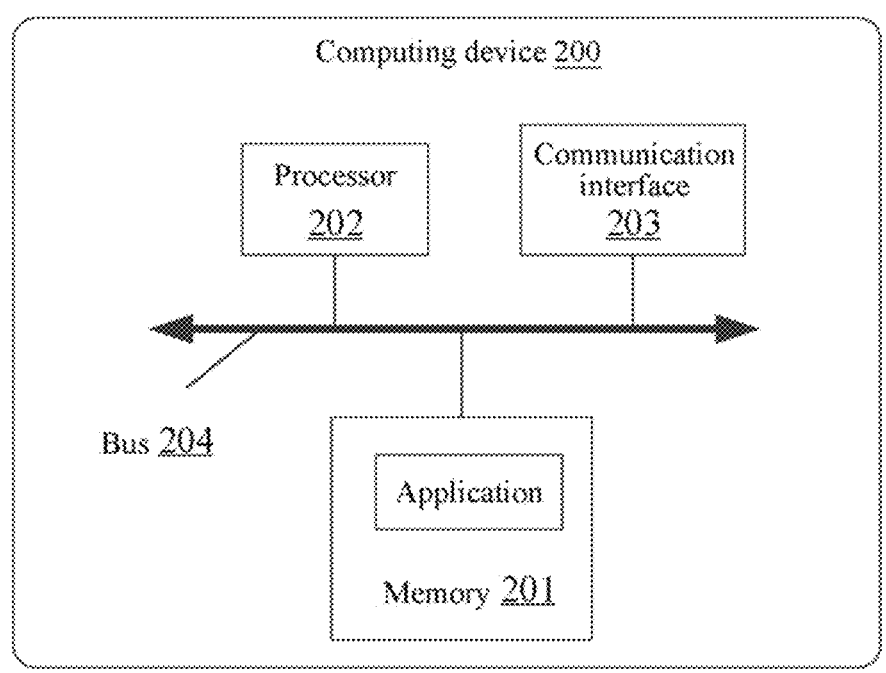
FIG. 12 is a block diagram of a computing device involved in an embodiment of the disclosure.

FIG. 12 is a block diagram of a computing device involved in an embodiment of the disclosure. The device may be the computing device shown in FIG. 2, which is configured to perform the warning method for a driving risk described in the foregoing embodiments. Reference may be made to the description in the foregoing method embodiments for details.

The computing device 200 shown in FIG. 12 includes a memory 201, a processor 202 and a communication interface 203. The memory 201, the processor 202 and the communication interface 203 are in communication with each other. For example, the memory 201, the processor 202 and the communication interface 203 may use a network connection manner to implement a communication connection. Alternatively, the foregoing computing device 200 may further include a bus 204. The memory 201, the processor 202 and the communication interface 203 are in communication connection with each other through the bus 204. FIG. 12 is a computing device 200 in which the memory 201, the processor 202 and the communication interface 203 are in communication connection with each other through the bus 204.

The memory 201 may be a read-only memory (Read Only Memory, ROM), a static storage device, a dynamic storage device, or a random access memory (Random Access Memory, RAM). The memory 201 may store a program, and when the program stored in the memory 201 is executed by the processor 202, the processor 202 and the communication interface 203 are configured to perform the foregoing warning method.

The processor 202 may adopt a general central processing unit (CPU), a microprocessor, an application specific integrated circuit (ASIC), a graphics processing unit (GPU), or one or more integrated circuits.

The processor 202 may further be an integrated circuit chip with a signal processing capability. In an embodiment, the warning method of the disclosure may be performed by using an integrated logic circuit in a hardware form in the processor 202 or an instruction in a software form. The foregoing processor 202 may further be a general-purpose processor, a digital signal processor (DSP), an application specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor, or the like. The software module may be stored in a storage medium that is mature in the art, such as a RAM, a flash memory, a read-only memory (ROM), a programmable ROM, an electrically erasable programmable memory, or a register. The storage medium is located in the memory 201, and the processor 202 reads information in the memory 201 and completes the warning method of the embodiments of the disclosure in combination with hardware thereof.

The communication interface 203 uses, for example, but not limited to, a receiving/transmitting module such as a transceiver, to implement communication between the computing device 200 and another device or a communication network. For example, a data set may be obtained through the communication interface 203.

When the foregoing computing device 200 includes the bus 204, the bus 204 may include a path for transferring information among components (for example, the memory 201, the processor 202, the communication interface 203) of the computing device 200.

In addition, an embodiment of the disclosure further provides a storage medium. The storage medium is configured to store a computer program. The computer program is configured to perform the methods provided in the foregoing embodiments.

An embodiment of the disclosure further provides a computer program product including instructions. When the computer program product runs on a computer, the computer is caused to perform the methods provided in the foregoing embodiments.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the processes or functions according to the embodiments of the present invention are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The warning method and apparatus for a driving risk, the computing device and the storage medium provided in the embodiments of the disclosure obtain the dangerous driving behavior data of the driver in the first time period, and obtain the correspondence between the quantity of occurrences of the dangerous driving behaviors and the actual quantity of occurrences of dangerous scenarios. The correspondence may truly reflect the relationship between the quantity of occurrences of the actual occurrence of the dangerous scenario and the quantity of occurrences of the dangerous driving behaviors made by the driver before the driver encounters the dangerous scenario. Therefore, the target quantity of times for which the driver may encounter different dangerous scenarios in the first time period may be accurately predicted through the correspondence and the quantity of occurrences of the dangerous driving behaviors involved in the dangerous driving behavior data and the risk warning is given to the driver based on the warning information generated by the target quantity of times. Because the warning information is determined according to the dangerous scenarios that may be caused by the dangerous driving behaviors of the driver, the driver may clearly learn what kind of serious consequences his dangerous driving behaviors may cause through the warning. This result-oriented warning method has an intuitive prompt, which may effectively improve the efficiency of human-computer interaction and achieve the purpose of regulating driving behaviors.

Persons skilled in the art would clearly understand that for convenience and conciseness of description, for specific working processes of the foregoing described system, apparatus and unit, reference may be made to the corresponding processes in the foregoing method embodiments, and details are not described herein. In addition, reference may also be made to various method embodiments and various apparatus embodiments, and the same or corresponding content in different embodiments may be referred to each other, and details are not described.

What is claimed is:

1. A warning method for a driving risk, performed by a computing device having a display function, the method comprising:
    obtaining driving behavior data, which are related to preset driving behaviors of a driver, in a first time period, and obtaining a correspondence between a quantity of occurrences of preset driving behaviors of one or more drivers and a quantity of actual occurrences of preset scenarios to the one or more drivers while driving;
    predicting, based on a quantity of actual occurrences of the preset driving behaviors of the driver, indicated in the driving behavior data of the driver, and the correspondence, a target quantity of times the driver is predicted to encounter one or more preset scenarios in the first time period;
    generating warning information based on the target quantity of times; and
    providing, using the display function, the warning information to the driver,
    wherein the obtaining the driving behavior data comprises:
    obtaining a driver image collected by a first in-vehicle camera in the first time period;
    by using a pre-trained image recognition model that is trained to recognize facial features that are related to states of face parts and behavioral features that are related to movements of body parts, recognizing a quantity of actual occurrences of different types of preset driving behaviors in the driver image based on types of the preset driving behaviors; and
    obtaining the driving behavior data based on the recognized quantity of the actual occurrences,
    wherein the generating warning information based on the target quantity of times comprises:
    determining warning probabilities respectively corresponding to different preset scenarios based on the target quantity of times; and
    determining at least one preset scenario for warning based on the warning probabilities, and generating the warning information based on the at least one preset scenario for warning, and
    wherein, when two or more preset scenarios for warning are determined, the providing the warning information comprises displaying the two or more preset scenarios in a form of a list in which each of the two or more preset scenarios is shown in association with a corresponding predicted target quantity of times, the list being arranged in a manner such that a preset scenario having a higher warning probability is preferentially displayed in the list than a preset scenario having a lower warning probability.

2. The method according to claim 1, wherein the obtaining the correspondence comprises:
    obtaining historical driving behavior data and historical preset scenario data of the driver in a historical time period;
    determining a behavior historical quantity of times of different preset driving behaviors of the driver in the historical time period based on the historical driving behavior data of the driver;
    determining a scenario historical quantity of times of different preset scenarios encountered by the driver in the historical time period based on the historical preset scenario data of the driver; and
    obtaining the correspondence based on the behavior historical quantity of times and the scenario historical quantity of times.

3. The method according to claim 1, wherein the warning information comprises the target quantity of times.

4. The method according to claim 1, wherein the obtaining the driving behavior data further comprises:
    obtaining the driving behavior data of the driver in the first time period from a second in-vehicle camera, the second in-vehicle camera being configured to collect a driver image, and generating the driving behavior data by performing preset driving behavior recognition on the collected driver image based on types of the preset driving behaviors.

5. The method according to claim 1, wherein the method further comprises:
   obtaining preset scenario data of a vehicle where the driver is in a second time period; and
   predicting a prediction quantity of times of preset driving behaviors of the driver in the second time period based on a quantity of occurrences of preset scenarios involved in the preset scenario data and the correspondence.

6. A computing device, comprising: a memory and a processor;
   the memory being configured to store a computer program; and
   the processor being configured to execute the computer program to implement the warning method for a driving risk according to claim 1.

7. A warning apparatus for a driving risk, comprising:
   at least one memory configured to store program code; and
   at least one processor configured to read the program code and operate as instructed by the program code, the program code comprising:
   first obtaining code configured to cause the at least one processor to obtain driving behavior data of a driver in a first time period, and obtain a correspondence between a quantity of occurrences of preset driving behaviors of one or more drivers and a quantity of actual occurrences of preset scenarios to the one or more drivers while driving;
   first prediction code configured to cause the at least one processor to predict, based on a quantity of actual occurrences of the preset driving behaviors of the driver, indicated in the driving behavior data of the driver, and the correspondence, a target quantity of times the driver is predicted to encounter one or more preset scenarios in the first time period;
   generating code configured to cause the at least one processor to generate warning information based on the target quantity of times; and
   providing code configured to cause the at least one processor to provide, using a display function, the warning information to the driver,
   wherein the first obtaining code is configured to cause the at least one processor to:
   obtain a driver image collected by a first in-vehicle camera in the first time period;
   by using a pre-trained image recognition model that is trained to recognize facial features that are related to states of face parts and behavioral features that are related to movements of body parts, recognize a quantity of actual occurrences of different types of preset driving behaviors in the driver image based on types of the preset driving behaviors; and
   obtain the driving behavior data based on the recognized quantity of the actual occurrences,
   wherein the generating code is configured to cause the at least one processor to:
   determine warning probabilities respectively corresponding to different preset scenarios based on the target quantity of times; and
   determine at least one preset scenario for warning based on the warning probabilities, and generate the warning information based on the at least one preset scenario for warning, and
   wherein, when two or more preset scenarios for warning are determined, the providing code is configured to cause the at least one processor to display the two or more preset scenarios in a form of a list in which each of the two or more preset scenarios is associated with a corresponding predicted target quantity of times, the list being arranged in a manner such that a preset scenario having a higher warning probability is preferentially displayed in the list than a preset scenario having a lower warning probability.

8. The apparatus according to claim 7, wherein the first obtaining code comprises:
   first obtaining sub-code configured to cause the at least one processor to obtain historical driving behavior data and historical preset scenario data of the driver in a historical time period;
   first determining sub-code configured to cause the at least one processor to determine a behavior historical quantity of times of different preset driving behaviors of the driver in the historical time period based on the historical driving behavior data of the driver;
   second determining sub-code configured to cause the at least one processor to determine a scenario historical quantity of times of different preset scenarios encountered by the driver in the historical time period based on the historical preset scenario data of the driver; and
   second obtaining sub-code configured to cause the at least one processor to obtain the correspondence based on the behavior historical quantity of times and the scenario historical quantity of times.

9. The apparatus according to claim 7, wherein the warning information comprises the target quantity of times.

10. The apparatus according to claim 7, wherein the generating code is configured to cause the at least one processor to generate a random number, and determine the at least one preset scenario for warning based on the warning probabilities respectively corresponding to different preset scenarios and the random number.

11. The method according to claim 10, wherein the determining the at least one preset scenario for warning based on the warning probabilities comprises:
    generating a random number; and
    determining the at least one preset scenario for warning based on the warning probabilities respectively corresponding to different preset scenarios and the random number.

12. The method according to claim 11, wherein the determining the at least one preset scenario for warning based on the warning probabilities respectively corresponding to different preset scenarios and the random number comprises:
    determining a (k+1)th preset scenario as a preset scenario for warning based on the random number being greater than a sum of the warning probabilities of first k preset scenarios and less than or equal to a sum of the warning probabilities of first k+1 preset scenarios; and
    determining a kth preset scenario as the preset scenario for warning based on the random number being greater than a first numerical value, and less than or equal to the sum of the warning probabilities of the first k preset scenarios;
    wherein the first numerical value is a sum of the warning probabilities of first k−1 preset scenarios with respect to k that is greater than 1, and the first numerical value is 0 with respect to k that is equal to 1.

13. The apparatus according to claim 10, wherein the generating code is configured to cause the at least one processor to determine the at least one preset scenario for warning based on the warning probabilities respectively corresponding to different preset scenarios and the random number by performing:

determining a (k+1)th preset scenario as the preset scenario for warning based on the random number being greater than a sum of the warning probabilities of first k preset scenarios and less than or equal to a sum of the warning probabilities of first k+1 preset scenarios; and determining a kth preset scenario as the preset scenario for warning based on the random number being greater than a first numerical value, and less than or equal to the sum of the warning probabilities of the first k preset scenarios;

wherein the first numerical value is a sum of the warning probabilities of first k−1 preset scenarios with respect to k that is greater than 1, and the first numerical value is 0 with respect to k that is equal to 1.

14. The apparatus according to claim 7, wherein the first is configured to cause the at least one processor to obtain the driving behavior data, by obtaining the driving behavior data of the driver in the first time period from a second in-vehicle camera, the second in-vehicle camera being configured to collect a driver image and generating the driving behavior data by performing preset driving behavior recognition on the collected driver image based on types of the preset driving behaviors.

15. The apparatus according to claim 7, wherein the program code further comprises:

second obtaining code configured to cause the at least one processor to obtain preset scenario data of a vehicle where the driver is in a second time period; and second prediction code configured to cause the at least one processor to predict a prediction quantity of times of preset driving behaviors of the driver in the second time period based on a quantity of occurrences of preset scenarios involved in the preset scenario data and the correspondence.

16. A non-transitory computer-readable storage medium, storing a computer program, the computer program being configured to perform a warning method for a driving risk, the method comprising:

obtaining driving behavior data of a driver in a first time period, and obtaining a correspondence between a quantity of occurrences of preset driving behaviors of one or more drivers and a quantity of actual occurrences of preset scenarios to the one or more drivers while driving;

predicting, based on a quantity of actual occurrences of the preset driving behaviors of the driver, indicated in the driving behavior data of the driver, and the correspondence, a target quantity of times the driver is predicted to encounter one or more preset scenarios in the first time period;

generating warning information based on the target quantity of times; and providing, using a display function, the warning information to the driver, wherein the obtaining the driving behavior data comprises:

obtaining a driver image collected by a first in-vehicle camera in the first time period;

by using a pre-trained image recognition model that is trained to recognize facial features that are related to states of face parts and behavioral features that are related to movements of body parts, recognizing a quantity of actual occurrences of different types of preset driving behaviors in the driver image based on types of the preset driving behaviors; and obtaining the driving behavior data based on the recognized quantity of the actual occurrences, wherein the generating warning information based on the target quantity of times comprises:

determining warning probabilities respectively corresponding to different preset scenarios based on the target quantity of times; and determining at least one preset scenario for warning based on the warning probabilities, and generating the warning information based on the at least one preset scenario for warning, and wherein, when two or more preset scenarios for warning are determined, the providing the warning information comprises displaying the two or more preset scenarios in a form of a list in which each of the two or more preset scenarios is associated with a corresponding predicted target quantity of times, the list being arranged in a manner such that a preset scenario having a higher warning probability is preferentially displayed in the list than a preset scenario having a lower warning probability.

\* \* \* \* \*